United States Patent

Shinada et al.

[11] Patent Number: 5,486,543
[45] Date of Patent: Jan. 23, 1996

[54] FORMED THERMOPLASTIC RESIN ARTICLE AND PRODUCTION PROCESS THEREOF

[75] Inventors: Tsunetoshi Shinada; Katsuo Wada, both of Yokohama; Haruo Inoue, Zushi; Masaki Misumi, Chigasaki; Akira Saito, Yokohama, all of Japan

[73] Assignee: Mitsui Toatsu Chemicals, Inc., Tokyo, Japan

[21] Appl. No.: 171,443

[22] Filed: Dec. 22, 1993

[30] Foreign Application Priority Data

Dec. 28, 1992 [JP] Japan ..................... 4-348205

[51] Int. Cl.$^6$ ............... C08F 2/60; C08F 16/00
[52] U.S. Cl. ............... 521/149; 521/77; 521/7; 521/142; 521/146; 525/211; 525/232; 525/233
[58] Field of Search ................ 525/211, 232, 525/233; 521/77, 142, 146, 149

[56] References Cited

U.S. PATENT DOCUMENTS

| | | | |
|---|---|---|---|
| 4,532,306 | 7/1985 | Sugio et al. | 525/397 |
| 4,571,416 | 2/1986 | Jarzombek et al. | |
| 5,047,440 | 9/1991 | Wilson, Jr. | |

FOREIGN PATENT DOCUMENTS

| | | |
|---|---|---|
| 143545 | 6/1985 | European Pat. Off. . |
| 51-58453 | 5/1976 | Japan . |
| 60-38449 | 2/1985 | Japan . |
| 60-49049 | 3/1985 | Japan . |
| 60-47051 | 3/1985 | Japan . |
| 60-65060 | 4/1985 | Japan . |
| 60-88065 | 5/1985 | Japan . |
| 60-110740 | 6/1985 | Japan . |
| 60-156709 | 8/1985 | Japan . |
| 61-16943 | 1/1986 | Japan . |
| 61-200151 | 9/1986 | Japan . |
| 2-240158 | 9/1990 | Japan . |
| 3-26740 | 2/1991 | Japan . |
| WO90/14384 | 11/1990 | WIPO . |

OTHER PUBLICATIONS

Database WPI, Week 8718, Derwent Publications Ltd., JPA-62 070429.

*Primary Examiner*—James J. Seidleck
*Assistant Examiner*—Duc Truong
*Attorney, Agent, or Firm*—Burns, Doane, Swecker & Mathis

[57] ABSTRACT

A formed thermoplastic resin article is made of a thermoplastic resin and a foamed elastic polymer finely dispersed in the thermoplastic resin. The formed thermoplastic resin article can be produced by blending an elastic polymer, in which an endothermic foaming agent decomposable at a temperature of at least 160° C. was mixed in advance at a temperature lower than a decomposition temperature of the endothermic foaming agent, in a thermoplastic resin and then plasticizing and forming the resultant resin blend at a temperature at least equal to the decomposition temperature of the endothermic foaming agent.

9 Claims, No Drawings

FORMED THERMOPLASTIC RESIN ARTICLE AND PRODUCTION PROCESS THEREOF

BACKGROUND OF THE INVENTION i) Field of the Invention

This invention relates to a formed thermoplastic resin article. More specifically, the present invention is concerned with a formed article of a resin combined with a specific elastic polymer and also to a composition useful for the formed article. This invention also pertains to a process for the production of such a formed article.

The term "formed article" as used herein should be interpreted in a broad sense so that it can embrace not only molded articles but also extruded or otherwise shaped articles.

The present invention has made it possible to provide formed resin articles of improved impact strength while retaining good surface appearance and other good physical properties.

ii) Description of the Related Art

Thermoplastic resins are used in a wide variety of fields, for example, as parts or components (hereinafter called collectively "component" or "components") for home electric and electronic appliances and automotive vehicles because of their good formability, i.e., moldability or the like and the good surface appearance of articles formed therefrom.

In these fields, each component is required to have a certain degree of strength, for example, to prevent its breakage even when dropped, to retain various functions during daily use and/or to ensure safety to the human body.

In particular, formed resin articles employed as exterior components are required to have both good surface appearance and high strength so that thermoplastic resins for such articles have been improved in various ways with respect to their impact strength.

A variety of methods are practiced with a view to improving the impact strength of a thermoplastic resin, including blending a particular thermoplastic resin with another thermoplastic resin to provide a polymer alloy having improved impact strength (Japanese Patent Laid-Open Nos. 240158/1990 and 26740/1991), broadening the molecular weight distribution of a specific thermoplastic resin to improve its impact strength (Japanese Patent Publication Nos. 73583/1991 and 42379/1990), or adding a particular additive to a thermoplastic resin to improve its impact strength (Japanese Patent Laid-Open No. 65060/1985 and U.S. Pat. No. 4,532,306).

It is also commonly practiced to improve the impact strength of a thermoplastic resin by dispersing an elastic polymer in various forms in the thermoplastic resin.

In styrene resins, for example, there are known HIPS resins (high-impact polystyrene resins) obtained by blending an elastic polymer, such as styrene-graft-polymerized polybutadiene or block SBR, in GPPS resin (general-purpose polystyrene resin); and ABS resins obtained by blending an elastic polymer, such as acrylonitrile- or styrene-graft-polymerized polybutadiene or block SBR, in AS resin.

With respect to polyolefin resins, on the other hand, it is known to improve the impact strength of PP resin or PE resin by blending an elastic polymer such as EPM or EPDM in it.

To improve the impact strength of a thermoplastic resin by using such an elastic polymer, the elastic polymer is added by (1) either polymerizing or blending the elastic component during polymerization of the thermoplastic resin itself or (2) incorporating the elastic polymer upon processing the thermoplastic resin into a resin composition.

In connection with the method (1), varies improved methods have been proposed over many years. Examples of known methods include to disperse an elastic polymer in a greater amount in a thermoplastic resin or to control an elastic polymer to a specific particle size distribution prior to its dispersion (Japanese Patent Laid-Open No. 156709/1985, Japanese Patent Laid-Open No. 47051/1985, etc.) and to distribute an elastic polymer in which a thermoplastic resin has been polymerized at an increased graft ratio to improve the compatibility with the thermoplastic resin to be used (Japanese Patent Laid-Open No. 58453/1976).

On the other hand, known examples of the method (2) include to incorporate by a kneader, extruder or the like one of various elastic polymers, which are compatible with a thermoplastic resin, in an amount sufficient to impart desired physical properties (Japanese Patent Laid-Open No. 200151/1986; Japanese Patent Publication Nos. 25975/1992 and 6656/1989).

The approach which involves mixing and dispersion of an elastic polymer in a thermoplastic resin to improve the impact strength of the latter can generally improve the impact strength in proportion to an increase in the proportion of the elastic polymer but, on the other hand, is accompanied by the drawbacks that physical properties of an article, such as surface gloss, rigidity and heat resistance, are deteriorated or the flowability is substantially lowered upon forming. It has therefore remained as a difficult goal for many years to provide a formed thermoplastic resin article with improved impact strength while retaining good external appearance and various good physical properties.

SUMMARY OF THE INVENTION

With a view to arriving at the above goal, the present inventors have conducted an extensive investigation on formed articles of thermoplastic resins blended with elastic polymers. As a result, they have now found a formed article having extremely high impact strength and also a process for its production, leading to the present invention.

In one aspect of the present invention, there is thus provided a formed thermoplastic resin article characterized in that a foamed elastic polymer is finely dispersed in a thermoplastic resin. Preferably, the elastic polymer has been foamed by an endothermic foaming agent.

In another aspect of the present invention, there is also provided a formed thermoplastic resin article characterized in that said formed article has been obtained by blending an elastic polymer, in which an endothermic foaming agent decomposable at a temperature of at least 160° C. is mixed in advance at a temperature lower than a decomposition temperature of the endothermic foaming agent, in a thermoplastic resin and then plasticizing and forming the resultant resin blend at a temperature at least equal to the decomposition temperature of the endothermic foaming agent.

In a further aspect of the present invention, there is also provided a process for the production of a formed thermoplastic resin article with improved impact strength, characterized in that said process comprises plasticizing and forming a resin composition at a temperature at least equal to a decomposition temperature of an endothermic foaming agent decomposable at a temperature of at least 160° C., said resin composition comprising a thermoplastic resin and a resin blend obtained by mixing the endothermic foaming agent in an elastic polymer at a temperature lower than the decomposition temperature of the endothermic foaming agent.

The formed articles according to the present invention are usable in a wide variety of fields where formed articles are required to have high strength while their external appearance is also regarded as important, for example, as various components, such as those for home electric or electronic appliances, office automation equipment and automotive vehicles, sheets, containers and so on.

DETAILED DESCRIPTION OF THE INVENTION

Usable examples of the elastic polymer include synthetic rubbers and thermoplastic elastomers, which can be produced by polymerizing various monomers. Also included are graft polymers of various monomers, which have compatibility with the thermoplastic resin to which the elastic polymer is to be added, at the stage of polymerization of such synthetic rubbers and thermoplastic elastomers.

Preferred usable synthetic rubbers include those commonly usable as rubber components in the form of blends with resins, for example, including SBR (styrene-butadiene rubber), BR (polybutadiene rubber), IR (polyisoprene rubber), EPM (ethylene-propylene copolymer), EPDM (ethylene-propylene-diene copolymer), NBR (acrylonitrile-butadiene copolymer rubber), EBR (ethylene-butene rubber), CR (chloroprene rubber), IIR (butyl rubber), urethane rubber, polysulfide rubber, hydrogenated nitrile rubber, special polyether-base resin, fluorinated rubber, tetrafluoroethylene, propylene rubber, propylene oxide rubber, ethylene-acrylic rubber, and ABS-B-polymer (polybutadiene rubber and/or styrene-butadiene-rubber grafted with styrene and/or acrylonitrile; rubber content is from 25 to 5 wt. %, preferably 30 to 60 wt. %; hereinafter called "ABS-B-polymer").

Further, such synthetic rubbers can also be used in combination, optionally together with a third component. They can also be used in a form graft-polymerized with one or more of various monomers having compatibility with the thermoplastic matrix resin to which the synthetic rubbers are to be added.

Illustrative of thermoplastic elastomers usable in the present invention include known high molecular materials which have properties between rubbers and plastics so that they have similar properties to crosslinked rubbers at room temperature but behave in the same manner as thermoplastic resins at high temperatures. These high molecular materials contain, in their molecules; a soft segment having elastic properties and a hard segment capable of preventing plastic deformation. Usable examples include styrene thermoplastic elastomers prepared in combination of polystyrene as a hard segment and polyisoprene, polybutadiene, EPM or the like as a soft segment; olefin thermoplastic elastomers prepared in combination of polypropylene, polyethylene or the like as a hard segment and EPM, EPDM or the like as a soft segment; polyamide thermoplastic elastomers prepared in combination of polyamide as a hard segment and a polyether, a polyester or the like as a soft segment; polyurethane thermoplastic elastomers, polyester thermoplastic elastomers, polyvinyl chloride thermoplastic elastomers; and fluorine-containing thermoplastic elastomers.

These thermoplastic elastomers can also be used in combination, optionally together with a third component. They can also be used in a form graft-polymerized with one or more of various monomers having compatibility with the thermoplastic matrix resin to which the thermoplastic elastomers are to be added.

In the process of the present invention, it is also possible to use one or more synthetic rubbers in combination with one or more thermoplastic elastomers.

Particularly preferred for use in the process of the present invention are styrene-butadiene rubber, polybutadiene rubber, polyisoprene rubber, EPM, EPDM, acrylonitrile-butadiene copolymer rubber, and ABS-B-polymer.

As a foaming agent used in the present invention, an endothermic foaming agent is particularly preferred. Any endothermic foaming agent can be used insofar as its known decomposition temperature is higher than 160° C. It is however preferred to use an endothermic foaming agent which is known to decompose at a temperature of 180° C. or higher, notably 190° C. or higher. Usable examples of this endothermic foaming agent include polycarboxylic acids, inorganic carbonate compounds and mixtures thereof, which may have been surface-treated with monoglyceride, stearic acid, a silane coupling agent or the like to prevent adsorption of water.

Illustrative polycarboxylic acids include saturated or unsaturated dicarboxylic acids such as citric acid, fumaric acid and tartaric acid; and their salts with Ca, Mg, Na and the like. As preferred polycarboxylic acids, sodium hydrogencitrate and sodium citrate can be exemplified.

On the other hand, illustrative inorganic carbonate compounds include the carbonate compounds of alkali metals and alkaline earth metals, including sodium aluminum hydrogencarbonate, sodium carbonate and mixtures thereof.

Usable examples of endothermic foaming agents also include those disclosed in WO/90/14384. It is also preferred to use a mixture consisting of 1–5 parts by weight of a polycarboxylic acid such as citric acid, fumaric acid or tartaric acid and 1 part by weight of an inorganic carbonate compound such as sodium hydrogencarbonate or magnesium carbonate.

Usable endothermic foaming agents are not limited to the above-exemplified compositions but include those having a decomposition temperature of at least 160° C.

The amount of the endothermic foaming agent employed relative to the elastic polymer also varies depending on the type of the endothermic foaming agent. In general, however, it can be used in a range of 0.01–30 wt. %, preferably 0.05–5.0 wt. %, more preferably 0.2–3 wt. %, all based on the elastic polymer. A suitable amount can be chosen within this range.

Especially, when a carboxylic acid and an inorganic carbonate compound are used in combination as an endothermic foaming agent, a range of from 0.2 to 4.0 wt. % based on the elastic polymer is preferred. This endothermic foaming agent can be used in the form of a master batch in which the endothermic foaming agent is contained at a high concentration. In this case, the amount of the endothermic foaming agent to be used is determined in relation to the total amount of the elastic polymer to be added to the resin. When the endothermic foaming agent is added to the elastic polymer, it is necessary to add the endothermic foaming agent at a temperature lower than the decomposition temperature of the foaming agent.

As a method for adding the endothermic foaming agent to the elastic polymer, it is generally acceptable to incorporate the endothermic foaming agent at a temperature lower than its decomposition temperature by a single-screw or twin-screw extruder or in a Banbury mixer, co-kneader or the like. Here, the endothermic foaming agent can be used neat or in the form of a master batch in which the endothermic foaming agent has been mixed beforehand at a high concentration with an additional thermoplastic component. Besides the endothermic foaming agent, various additives such as a plasticizer and a dispersant can also be incorporated at the same time.

The elastic polymer with the endothermic foaming agent, which decomposes at a temperature of at least 160° C., added thereto at a temperature lower than the decomposition temperature of the endothermic foaming agent as described above is next mixed in a thermoplastic resin and is formed, whereby a formed article according to the present invention can be obtained.

Although no particular limitation is imposed on the thermoplastic resin to be used in accordance with the present invention, conventional thermoplastic resins called "general-purpose resins" or "engineering plastics" can be used, for example, including styrene resins such as polystyrene resin, AS resin and ABS resin, and olefin resins such as polyethylene resin and polypropylene resin, and as engineering plastics, polyester resins such as polyethylene terephthalate resin and polybutylene terephthalate, polyamide resins, polyacetal resins, polycarbonate resins and modified polyphenylene ether resins. Illustrative usable thermoplastic resins also include polymer alloys which are prepared by combining these resins or combining them with third components.

Among these resins, particularly preferred are polystyrene resins, AS resins, ABS resins, styrene resins, polyethylene resins and polypropylene resins.

As polypropylene resin, a block copolymer of propylene and ethylene is preferred.

An elastic polymer and a thermoplastic resin can be chosen in desired combination. Particularly preferred combinations include, for example, the combination of EPM and/or EPDM as an elastic polymer and a polypropylene resin as a thermoplastic resin; and the combination of ABS-B-polymer as an elastic polymer and AS resin, ABS resin or a polystyrene resin as a thermoplastic resin.

As a method for adding the composition of the elastic polymer and the endothermic foaming agent to the thermoplastic resin, the composition can be incorporated at a temperature lower than the foaming agent by a single-screw or twin-screw extruder or in a Banbury mixer or co-kneader. Where the composition is in the form of pellets, flakes or the like, it can be added in a Henschel mixer, rotary mixer or the like. It is however to be noted that the addition of the composition shall not limited particularly to the above-described method as long as the addition is effected at a temperature lower than the decomposition temperature of the foaming agent. Upon addition of the composition, it is also possible to incorporate or otherwise add, as needed, various additives such as a plasticizer, a parting agent, an antistatic agent and a flame retardant; glass fibers, carbon fibers or the like as a filler for the improvement of physical properties; and a colorant, dye or the like. Upon addition, it is necessary to add them at a temperature lower than the decomposition temperature of the foaming agent for the same reasons as mentioned above with respect to the addition of the endothermic foaming agent to the elastic polymer.

In the present invention, the thermoplastic resin and the elastic polymer containing the endothermic foaming agent are used in combination. Recommendable examples of the combination include known preferable combinations of thermoplastic resins and elastic polymers commonly employed by being blended or copolymerized with the thermoplastic resins to improve their impact resistance.

In these combinations, elastic polymers having compatibility with thermoplastic resins are generally selected. The expression "having compatibility with thermoplastic resins" as used herein means that the elastic polymer contains as a part of its components a part of the components of the thermoplastic resin, has a solubility parameter (SP value) close to that of the thermoplastic resin or contains functional groups capable of bonding to the thermoplastic resin. If the elastic polymer does not have compatibility with the thermoplastic resin, the elastic polymer cannot contribute to an improvement in the impact resistance of the resulting formed article.

Regarding the blending ratio of the elastic polymer to the thermoplastic resin, it is generally preferred to blend the elastic polymer in such a proportion that is known in the art to improve the impact resistance of the thermoplastic resin when the elastic polymer is blended in a conventional manner. In general, the elastic polymer can be added in a proportion of 0.5–60 wt. %, preferably 0.8–30 wt. %, more preferably 1.0–20 wt. %. Within the above range, the ratio of the elastic polymer to the thermoplastic resin can be freely chosen to obtain intended physical properties. For example, the present invention can obtain higher impact resistance even when the elastic polymer is used in the same proportion. To obtain a formed article of the same impact resistance, it is therefore possible to use the elastic polymer in a smaller amount. This makes it possible to obtain a formed article with well-balanced rigidity and impact resistance.

As the above resin composition is plasticized at a temperature at least equal to the decomposition temperature of the endothermic foaming agent contained therein, it can be formed by any forming process commonly employed for thermoplastic resins, for example, not only by general injection molding or extrusion but also by blow molding or low-pressure molding.

Upon formation of the thermoplastic resin composition by injection molding, extrusion or a like process, the plasticizing temperature can be 160° C. or higher, generally 200°–240° C. for polypropylene resin and 180° C. or higher, generally 200°–260° C. for polystyrene resin and ABS resin. For resin compositions obtained by adding various additives and fillers to these resins, engineering plastics, polymer alloys composed of these general-purpose resins and engineering plastics or resin compositions obtained by adding various additives, fillers and the like to these resins, the plasticizing temperature is 160° C. or higher in general.

When the decomposition, i.e., foaming temperature of a foaming agent is lower than the plasticizing temperature of a thermoplastic resin or a composition thereof employed, foaming takes place prior to the plasticization of the resin so that the resulting gas is released into the atmosphere. As a consequence, the surface of the resulting formed article presents a poor external appearance called "silver streaking" and, moreover, no effective foamed cells can be formed inside the resin.

At least 160° C. is therefore needed as a post-plasticization decomposing and foaming temperature for the above thermoplastic resin or the composition thereof. It is desired to use an endothermic foaming agent which undergoes a decomposition reaction at a temperature ranging from a temperature higher by 20°–30° C. than the plasticization initiating temperature of the thermoplastic resin or the composition thereof employed to the upper limit of the plasticization temperature. Here, it is necessary that a principal endotherm peak of DTA (differential thermal analysis), said peak indicating an endothermic decomposition reaction, appears on a side of high temperatures above 160° C. It is immaterial how many endotherm peaks appear.

In the present invention, use of a foaming agent which undergoes an endothermic reaction, especially upon decomposition, i.e., foaming is particularly preferred. When such an endothermic foaming agent in an elastic polymer dispersed in a thermoplastic resin is caused to decompose, an endothermic reaction which takes place upon decomposition, i.e., foaming inhibits or otherwise reduces plasticization of the surrounding elastic polymer and thermoplastic resin. The gas formed as a result of the decomposition reaction is hence confined in a finely divided form to portions of the thermoplastic resin, surrounding the elastic polymer dispersed in the thermoplastic resin, and/or to the interiors of the elastic polymer, so that the gas is not allowed to escape to the surface of a formed article. Accordingly, use of an endothermic foaming agent is particularly recommended to ensure the provision of a formed article having good external appearance.

If the foaming agent is added at its decomposition temperature or higher, the elastic polymer itself is foamed. Even when the resulting elastic polymer is subsequently added to the thermoplastic resin, the foaming agent can no longer form effective minute foams or foamed cavities in the thermoplastic resin and, moreover, foamed cells in the elastic polymer are caused to collapse and are hence eliminated. The foaming agent cannot therefore be used effectively.

It is essential for the present invention that the resin composition—which has been obtained by adding the elastic polymer, said elastic polymer having been processed as described above and containing the endothermic foaming agent therein, to the thermoplastic resin—be plasticized at a temperature at least equal to the decomposition temperature of the endothermic foaming agent to obtain a formed resin article with minute foams formed in portions of the thermoplastic resin, surrounding the elastic polymer dispersed in the thermoplastic resin, and/or in the interiors of the elastic polymer.

If the resin composition is plasticized and formed at a temperature lower than the decomposition temperature of the foaming agent contained therein, the foaming agent added therein does not decompose and no foaming takes place. It is therefore impossible to observe on the resulting formed article such a significant improvement in impact strength as that available from the addition of the foaming agent in accordance with the present invention, although the formed article may show an improvement in impact strength to such an extent as available from mere addition of the elastic polymer to the thermoplastic resin as in the conventional art.

The formed resin article so obtained is an epoch-making article with the impact strength significantly improved while retaining an excellent external appearance and various good properties such as high rigidity and heat resistance.

EXPERIMENT 1

A master batch—which had been obtained by combining polypropylene with 25 wt. %, based on the master batch, of an endothermic foaming agent capable of undergoing a decomposition reaction at about 193° C. ("ACTIVEX 536", trade name; product of J. M. Huber & Co.; composed primarily of a polycarboxylic acid and an inorganic carbonate compound)—was mixed with EPM ["EP02P", trade name; product of Japan Synthetic Rubber CO., Ltd.; ethylene content: 74 wt. %; Mooney viscosity, $ML_{1+4}(100°$ C.): 24; MI: 3.2 g/10 min(230° C.)] as an elastic polymer in such a way that the master batch amounted to 0.5 wt. % of the EPM. The resultant resin mixture was extruded and pelletized at a cylinder temperature of 160°–170° C. through an extruder (a twin-screw extruder manufactured by Nakatani Kikai K. K.), whereby an elastic polymer composition A1 containing the endothermic foaming agent was obtained in the form of pellets.

The composition A1 was then blended at room temperature with mixtures of the EP rubber as the elastic polymer and polypropylene resin ("Mitsui NOBLEN BJHH", trade name; product of Mitsui Toatsu Chemicals, Inc.), respectively, in a Henschel mixer so that the NET contents of the foaming agent became 0.010, 0.025, 0.050 and 0.075 wt. %. Resin compositions B1 were hence obtained. For the sake of comparison, only the EP rubber which did not contain the foaming agent at all was similarly blended to the polypropylene resin, so that comparative resin compositions C-1 were also obtained.

Each resin composition B1 was molded into square plates of 150 mm x 150 mm x 3 mm dimensions with an injection molding machine ("480-150", trade name; manufactured by Sumitomo Heavy Industries, Inc.) by setting its cylinder temperature at 190° C., 210° C. and 230° C., respectively. Each comparative resin composition C1 which did not contain the foaming agent was also molded likewise at an ordinary molding temperature of 210° C.

The external appearance of each square plate so molded was observed for silver streaking or the like on its surface. At a central part of the square plate, the surface gloss was measured at an incident angle of 60° in accordance with ASTM D-523. Further, test pieces were formed from each square plate by punching the same. Measured were the Izod impact strength (notched) under ASTM D-256, the flexural modulus of elasticity under ASTM D-790 and the heat distortion temperature under ASTM D-648.

EXAMPLE 1

The resin compositions B1 were individually molded at 210° C. and also at 230° C. Experimental results are presented in Table 1-1.

TABLE 1-1

| | Component/property | Resin composition B1 | | | |
|---|---|---|---|---|---|
| Composition | Polypropylene resin, wt. % | 98.000 | 95.000 | 90.000 | 85.000 |
| | EP rubber, wt. % | 1.990 | 4.975 | 9.950 | 14.925 |
| | Foaming agent (NET), wt. % | 0.010 | 0.025 | 0.050 | 0.075 |

TABLE 1-1-continued

| Component/property | | Resin composition B1 | | | |
|---|---|---|---|---|---|
| Physical properties of molded article | 210° C. Izod impact strength | 5.0 | 10.2 | 15.8 | 23.9 |
| | Flexural modulus of elasticity | 16,000 | 15,100 | 12,200 | 10,600 |
| | Heat distortion temperature | 106.1 | 102.4 | 100.3 | 98.0 |
| | Gloss | 78.2 | 73.6 | 69.8 | 72.0 |
| | External appearance | Good | Good | Good | Good |
| | 230° C. Izod impact strength | 6.1 | 11.7 | 16.5 | 22.1 |
| | Flexural modulus of elasticity | 17,400 | 15,000 | 12,600 | 11,200 |
| | Heat distortion temperature | 105.2 | 102.9 | 100.1 | 96.7 |
| | Gloss | 76.1 | 75.8 | 77.0 | 70.3 |
| | External appearance | Good | Good | Good | Good |

COMPARATIVE EXAMPLE 1-1

The resin compositions B1 were individually molded at 190° C. Experimental results are presented in Table 1-2.

TABLE 1-2

| Component/propety | | Resin composition B1 | | | |
|---|---|---|---|---|---|
| Composition | Polypropylene resin, wt. % | 98.000 | 95.000 | 90.000 | 85.000 |
| | EP rubber, wt. % | 1.990 | 4.975 | 9.950 | 14.925 |
| | Foaming agent (NET), wt. % | 0.010 | 0.025 | 0.050 | 0.075 |
| Physical properties of molded article | 190° C. Izod impact strength | 3.8 | 5.4 | 11.6 | 21.0 |
| | Flexural modulus of elasticity | 15,900 | 14,100 | 11,400 | 10,200 |
| | Heat distortion temperature | 105.4 | 103.5 | 100.7 | 98.9 |
| | Gloss | 77.5 | 72.8 | 67.8 | 69.0 |
| | External appearance | Good | Good | Good | Good |

COMPARATIVE EXAMPLE 1-2

Test results of physical properties of only the polypropylene resin ("Mitsui NOBLEN BJHH", trade name; product of Mitsui Toatsu Chemicals, Inc.) employed in the above example and comparative example and those of comparative resin compositions C1 free of the foaming agent are presented in Table 1-3.

TABLE 1-3

| Component/property | | Resin composition C1 | | | | |
|---|---|---|---|---|---|---|
| Composition | Polypropylene resin, wt. % | 100.00 | 98.000 | 95.000 | 90.000 | 85.000 |
| | EP rubber, wt. % | — | 1.990 | 4.975 | 9.950 | 14.925 |
| | Foaming agent (NET), wt. % | — | — | — | — | — |
| Physical properties of molded article | 210° C. Izod impact strength | 2.0 | 4.3 | 8.0 | 12.5 | 20.8 |
| | Flexural modulus of elasticity | 18,000 | 16,600 | 14,600 | 11,900 | 10,800 |
| | Heat distortion temperature | 116.0 | 105.8 | 103.1 | 101.2 | 98.8 |
| | Gloss | 85.0 | 78.9 | 71.2 | 64.1 | 67.5 |
| | External appearance | Good | Good | Good | Good | Good |

EXPERIMENT 2

An endothermic foaming agent capable of undergoing a decomposition reaction at about 193° C. ("ACTIVEX 535", trade name; master batch composed of EVA and a foaming agent in an amount of 25 wt. % based on the master batch; product of J. M. Huber & Co.) was mixed with ABS-B-polymer [polybutadiene with acrylonitrile and styrene graft-polymerized thereon, ("DP-606", trade name; product of Japan Synthetic Rubber Co., Ltd.; polybutadiene content: 45 wt. %)] as an elastic polymer in such a way that the endothermic foaming agent amounted to 1 wt. % of the ABS-B-polymer. The resultant resin mixture was extruded and pelletized at a cylinder temperature of 160°–170° C. through an extruder (a twin-screw extruder manufactured by Nakatani Kikai K. K.), whereby an elastic polymer composition A2 containing the endothermic foaming agent was obtained in the form of pellets.

The composition A2 was then blended at room temperature with mixtures of ABS resin ["SANTAC ST-30", trade name; product of Mitsui Toatsu Chemicals, Inc.; polybutadiene content: 15 wt. %; acrylonitrile content: 25 wt. %; MI: 1.3 g/10 min(200° C.,5 kg)], which had compatibility with the elastic polymer, i.e., the polybutadiene with acrylonitrile and styrene graft-polymerized thereon, and AS resin ["LITAC-A 120PC"; trade name; product of Mitsui Toatsu Chemicals, Inc.; acrylonitrile content: 25 wt. %; MI: 2.2 g/10 min(200° C., 5 kg)], respectively, in a Henschel mixer so that the NET contents of the foaming agent became 0.010, 0.025, 0.050, 0.075 and 0.100 wt. %. Resin compositions B2 were hence obtained.

For the sake of comparison, comparative resin compositions C2 which did not contain the foaming agent at all were also prepared by similarly blending the polybutadiene, on which acrylonitrile and styrene had been graft-polymerized, and EVA ("Flex EV 250 P2807", trade name; product of Du Pont-Mitsui Polychemicals Co., Ltd.; the resin of the master batch of the foaming agent) with the mixture of the ABS resin and the AS resin.

Each resin composition B2 was molded into square plates of 150 mm x 150 mm x 3 mm dimensions with an injection molding machine ("480-150", trade name; manufactured by Sumitomo Heavy Industries, Inc.) by setting its cylinder temperature at 190° C., 210° C. and 230° C., respectively. Each comparative resin composition C2 which did not contain the foaming agent was also molded likewise at an ordinary molding temperature of 210° C.

The external appearance of each square plate so molded was observed for silver streaking or the like on its surface. At a central part of the square plate, the surface gloss was measured at an incident angle of 60° in accordance with JIS K-7105. Further, test pieces were cut out from each square plate. Measured were the Izod impact strength (unnotched) under JIS K-7110, the flexural modulus of elasticity under JIS K-7203 and the heat distortion temperature under JIS K-7207.

EXAMPLE 2

The resin compositions B2 were individually molded at 210° C. and also at 230° C. Experimental results are presented in Table 2-1.

TABLE 2-1

| Component/property | | Resin composition B2 | | | |
|---|---|---|---|---|---|
| Composition | ABS resin, wt. % | 96.990 | 92.475 | 84.950 | 77.425 |
| | AS resin, wt. % | 2.010 | 5.025 | 10.050 | 15.075 |
| | ABS-B-polymer, wt. % | 0.960 | 2.400 | 4.800 | 7.200 |
| | EVA, wt. % | 0.030 | 0.075 | 0.150 | 0.225 |
| | Foaming agent (NET), wt. % | 0.010 | 0.025 | 0.050 | 0.075 |
| Physical properties of molded article | 210° C. Izod impact strength | 40.7 | 43.3 | 46.9 | 43.3 |
| | Flexural modulus of elasticity | 19,400 | 20,800 | 20,400 | 20,100 |
| | Heat distortion temperature | 79.7 | 79.1 | 79.0 | 78.6 |
| | Gloss | 68.5 | 69.3 | 65.3 | 66.1 |
| | External appearance | Good | Good | Good | Good |
| | 230° C. Izod impact strength | 41.9 | 44.1 | 45.9 | 44.0 |
| | Flexural modulus of elasticity | 21,100 | 21,000 | 21,200 | 20,600 |
| | Heat distortion temperature | 79.3 | 78.8 | 79.0 | 79.2 |
| | Gloss | 78.3 | 79.8 | 82.4 | 84.0 |
| | External appearance | Good | Good | Good | Good |

COMPARATIVE EXAMPLE 2-1

The resin compositions B2 were individually molded at 190° C. Experimental results are presented in Table 2-2.

TABLE 2-2

| Component/property | | Resin composition B2 | | | |
|---|---|---|---|---|---|
| Composition | ABS resin, wt. % | 96.990 | 82.475 | 84.950 | 77.425 |
| | AS resin, wt. % | 2.010 | 5.025 | 10.050 | 15.075 |
| | ABS-B-polymer, wt. % | 0.960 | 2.400 | 4.800 | 7.200 |
| | EVA, wt. % | 0.030 | 0.075 | 0.150 | 0.225 |
| | Foaming agent (NET), wt. % | 0.010 | 0.025 | 0.050 | 0.075 |
| Physical properties of molded article | 190° C. Izod impact strength | 38.5 | 40.8 | 43.5 | 38.67 |
| | Flexural modulus of elasticity | 19,800 | 19,600 | 20,200 | 20,100 |
| | Heat distortion temperature | 79.0 | 78.8 | 78.3 | 77.6 |
| | Gloss | 51.7 | 56.7 | 55.2 | 52.7 |
| | External appearance | Good | Good | Good | Good |

COMPARATIVE EXAMPLE 2-2

Test results of physical properties of only the mixtures of the ABS resin ("SANTAC ST-30", trade name; product of Mitsui Toatsu Chemicals, Inc.) and the AS resin ("LITAC-A 120PC"; trade name; product of Mitsui Toatsu Chemicals, Inc.), said mixtures having been employed in the above example and comparative example, and those of the comparative resin compositions C2 free of the foaming agent are presented in Table 2-3.

TABLE 2-3

| Component/property | | Resin composition C2 | | | | |
|---|---|---|---|---|---|---|
| Composition | ABS resin, wt. % | 100.00 | 96.990 | 92.475 | 84.950 | 77.425 |
| | AS resin, wt. % | — | 2.010 | 5.025 | 10.050 | 15.075 |
| | ABS-B-polymer, wt. % | — | 0.960 | 2.400 | 4.800 | 7.200 |
| | EVA, wt. % | — | 0.030 | 0.075 | 0.150 | 0.225 |
| | Foaming agent (NET), wt. % | — | — | — | — | — |
| Physical properties of molded article | 210° C. Izod impact strength | 18.0 | 38.3 | 40.7 | 40.4 | 40.5 |
| | Flexural modulus of elasticity | 20,000 | 20,200 | 20,200 | 20,500 | 21,200 |
| | Heat distortion temperature | 82.0 | 79.1 | 79.5 | 79.1 | 78.7 |
| | Gloss | 91.0 | 68.0 | 71.8 | 71.4 | 75.4 |
| | External appearance | Good | Good | Good | Good | Good |

EXPERIMENT 3

An endothermic foaming agent capable of undergoing a decomposition reaction at about 193° C. ("ACTIVEX 535", trade name; master batch composed of EVA and a foaming agent in ah amount of 25 wt. % based on the master batch; product of J. M. Huber & Co.) was mixed to ABS-B-polymer (DP-606) as an elastic polymer in such a way that the endothermic foaming agent amounted to 1 wt. % of the ABS-B-polymer. The resultant resin mixture was extruded and pelletized at a cylinder temperature of 160°–170° C. through an extruder (a twin-screw extruder manufactured by Nakatani Kikai K. K.), whereby an elastic polymer composition A3 containing the endothermic foaming agent was obtained in the form of pellets.

The composition A3 was then blended at room temperature with the AS resin ("LITAC-A 120PC"; trade name; product of Mitsui Toatsu Chemicals, Inc.), respectively, in a Henschel mixer so that the NET contents of the foaming agent became 0.010, 0.030, 0.050, 0.070 and 0.100 wt. %. Resin compositions B3 were hence obtained.

For the sake of comparison, comparative resin compositions C3 which did not contain the foaming agent at all were also prepared by similarly blending the polybutadiene, on which acrylonitrile and styrene had been graft-polymerized, and EVA ("Flex EV 250 P2807", trade name; product of Du Pont-Mitsui Polychemicals Co., Ltd.; the resin of the master batch of the foaming agent) with the AS resin.

Each resin composition B3 was molded into square plates of 150 mm x 150 mm x 3 mm dimensions with an injection molding machine ("480-150", trade name; manufactured by Sumitomo Heavy Industries, Inc.) by setting its cylinder temperature at 190° C., 210° C. and 230° C., respectively. Each comparative resin composition C3 which did not contain the foaming agent was also molded likewise at an ordinary molding temperature of 210° C.

The external appearance of each square plate so molded was observed for silver streaking or the like on its surface. At a central part of the square plate, the surface gloss was measured at an incident angle of 60° in accordance with JIS K-7105. Further, test pieces were cut out from each square plate. Measured were the Izod impact strength (unnotched) under JIS K-7110, the flexural modulus of elasticity under JIS K-7203 and the heat distortion temperature under JIS K-7207.

EXAMPLE 3

The resin compositions B3 were individually molded at 210° C. and also at 230° C. Experimental results are presented in Table 3-1.

TABLE 3-1

| Component/property | | Resin composition B3 | | | | |
|---|---|---|---|---|---|---|
| Composition | AS resin, wt. % | 67.00 | 67.00 | 67.00 | 67.00 | 67.00 |
| | ABS-B-polymer, wt. % | 32.96 | 32.88 | 32.80 | 32.72 | 32.60 |
| | EVA, wt. % | 0.03 | 0.09 | 0.15 | 0.21 | 0.30 |
| | Foaming agent (NET), wt. % | 0.01 | 0.03 | 0.05 | 0.07 | 0.10 |
| Physical properties of molded article | 210° C. Izod impact strength | 45.3 | 45.5 | 59.9 | 51.6 | 50.1 |
| | Flexural modulus of elasticity | 25,600 | 25,800 | 25,600 | 25,800 | 25,900 |
| | Heat distortion temperature | 76.7 | 76.5 | 76.7 | 76.6 | 76.4 |
| | Gloss | 91.5 | 92.3 | 92.3 | 92.1 | 92.9 |
| | External appearance | Good | Good | Good | Good | Good |
| | 230° C. Izod impact strength | 52.4 | 59.4 | 56.9 | 58.6 | 56.0 |
| | Flexural modulus of elasticity | 25,100 | 25,400 | 25,600 | 25,900 | 25,900 |
| | Heat distortion temperature | 76.8 | 76.7 | 76.7 | 76.8 | 76.7 |
| | Gloss | 923. | 91.8 | 92.4 | 92.0 | 91.6 |
| | External appearance | Good | Good | Good | Good | Good |

COMPARATIVE EXAMPLE 3-1

The resin compositions B3 were individually molded at 190° C. Experimental results are presented in Table 3-2.

TABLE 3-2

| Component/property | | Resin composition B3 | | | |
| --- | --- | --- | --- | --- | --- |
| Composition | AS resin, wt. % | 67.00 | 67.00 | 67.00 | 56.00 |
| | ABS-B-polymer, wt. % | 32.96 | 32.88 | 32.80 | 32.72 |
| | EVA, wt. % | 0.03 | 0.09 | 0.15 | 0.21 |
| | Foaming agent (NET), wt. % | 0.01 | 0.03 | 0.05 | 0.07 |
| Physical | 190° C. Izod impact strength | 40.8 | 41.1 | 42.7 | 42.5 |
| properties | Flexural modulus of elasticity | 26,600 | 26,300 | 26,100 | 25,900 |
| of | Heat distortion temperature | 76.5 | 76.3 | 76.4 | 76.6 |
| molded | Gloss | 91.7 | 92.7 | 91.2 | 92.7 |
| article | External appearance | Good | Good | Good | Good |

COMPARATIVE EXAMPLE 3-2

Test results of physical properties of only the AS resin ("LITAC-A 120PC"; trade name; product of Mitsui Toatsu Chemicals, Inc.) and those of the comparative resin compositions C3, all free of the foaming agent, are presented in Table 3-3.

TABLE 3-3

| Component/property | | Resin composition C3 | | | | |
| --- | --- | --- | --- | --- | --- | --- |
| Composition | AS resin, wt. % | 100.00 | 67.00 | 67.00 | 67.00 | 67.00 |
| | Polybutadiene, wt. % | — | 32.96 | 32.88 | 32.80 | 32.72 |
| | EVA, wt. % | — | 0.03 | 0.09 | 0.15 | 0.21 |
| | Foaming agent (NET), wt. % | — | — | — | — | — |
| Physical | 190° C. Izod impact strength | 2.4 | 40.3 | 42.3 | 41.2 | 42.1 |
| properties | Flexural modulus of elasticity | 37,000 | 26,700 | 26,600 | 27,100 | 26,700 |
| of | Heat distortion temperature | 86.0 | 76.6 | 76.4 | 76.5 | 76.4 |
| molded | Gloss | 92.0 | 91.0 | 91.8 | 91.4 | 91.4 |
| article | External appearance | Good | Good | Good | Good | Good |

What is claimed is:

1. A formed thermoplastic resin article comprising thermoplastic resin and foamed elastic polymer finely dispersed therein, wherein said formed thermoplastic resin article is obtained by blending an elastic polymer containing an endothermic foaming agent decomposable at a temperature of at least 160° C., said endothermic foaming agent being mixed with the elastic polymer at a temperature lower than the decomposition temperature of the endothermic foaming agent, in a thermoplastic resin and then plasticizing and forming the resultant resin blend at a temperature at least equal to the decomposition temperature of the endothermic foaming agent.

2. A process for preparing a formed thermoplastic resin article with improved impact strength comprising mixing an endothermic foaming agent having a decomposition temperature of at least 160° C. with an elastic polymer at a temperature lower than the decomposition temperature of the endothermic foaming agent, mixing the mixture of the elastic polymer and the endothermic foaming agent with a thermoplastic resin to form a resin composition and plasticizing and forming the resin composition at a temperature of at least 160° C. to form the thermoplastic resin article with improved impact strength.

3. A formed article of claim 1, wherein the elastic polymer amounts to 0.5–60 wt. % of the thermoplastic resin.

4. A formed article of claim 1, wherein the elastic polymer is selected from styrene-butadiene rubber, polybutadiene rubber, polyisoprene rubber, EPM, EPDM, acrylonitrile-butadiene copolymer rubber or ABS-B polymer.

5. A formed article of claim 1, wherein the thermoplastic resin is selected from polystyrene resin, AS resin, ABS resin, a styrene resin, polyethylene resin or polypropylene resin.

6. A formed article of claim 1, wherein the elastic polymer is EPM and/or EPDM and the thermoplastic resin is polypropylene resin.

7. A formed article of claim 1, wherein the elastic polymer is ABS-B polymer and the thermoplastic resin is AS resin, ABS resin or a styrene resin.

8. A formed article of claim 1, wherein the endothermic foaming agent is selected from a polycarboxylic acid, an inorganic carbonate compound or a mixture thereof.

9. A formed article of claim 1, wherein the endothermic foaming agent is mixed in an amount of 0.01–30 wt. % based on the elastic polymer.

* * * * *